June 7, 1927.
L. KIRSCHBRAUN ET AL
1,631,826
APPARATUS FOR SATURATING MATERIALS
Original Filed May 9, 1921
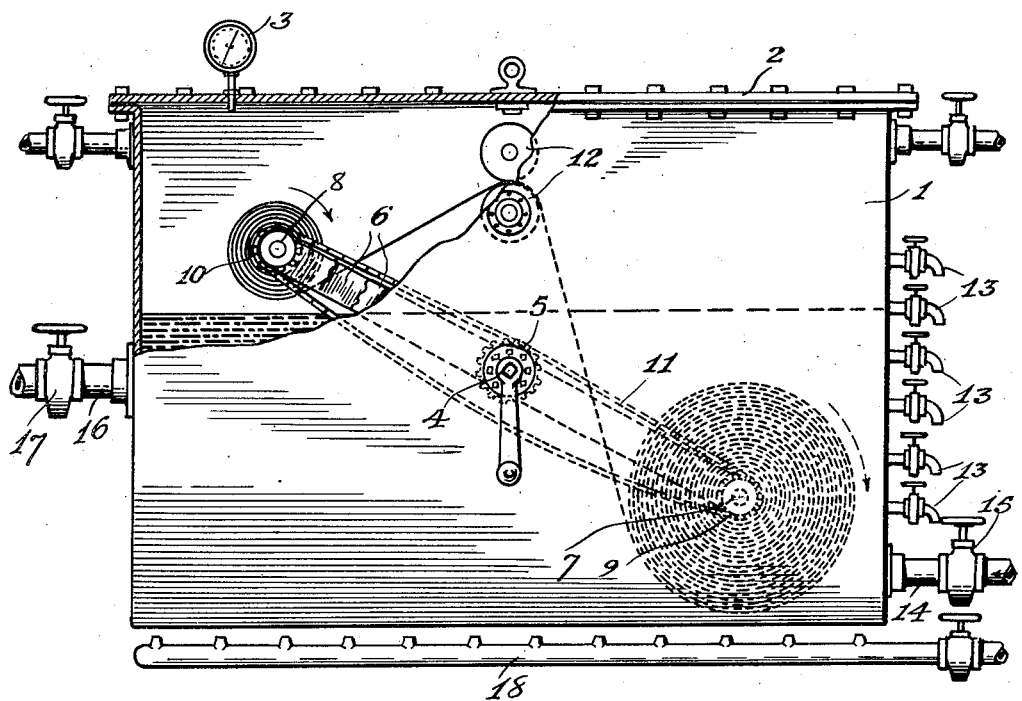
Witness,
S. S. Mann
Inventors,
Lester Kirschbraun.
Chester E. Rahr.
By Frank L. Belknap,
Atty.

Patented June 7, 1927.

1,631,826

UNITED STATES PATENT OFFICE.

LESTER KIRSCHBRAUN, OF CHICAGO, ILLINOIS, AND CHESTER E. RAHR, OF BOSTON, MASSACHUSETTS, ASSIGNORS TO THE FLINTKOTE COMPANY, OF BOSTON, MASSACHUSETTS, A CORPORATION OF MASSACHUSETTS.

APPARATUS FOR SATURATING MATERIALS.

Application filed May 9, 1921, Serial No. 467,831. Renewed December 19, 1924.

This invention relates to an apparatus for saturating materials and refers more particularly to the saturation of felted fibrous substances such as those used in the prepared roofing art.

Among the salient objects of the invention are to provide an apparatus by means of which felt or prepared roofing material of felted fibrous composition may be saturated with waterproofing substance under pressure and the waterproofing composition caused to uniformly permeate through the body of the material; to provide an apparatus in which the felted fibrous material is caused to pass through a bath of waterproofing substance while pressure is maintained upon an air-tight container, the material being reeled from one roll on to another during the saturation, permitting the waterproofing substance to completely impregnate and saturate the voids and interstices of the fibrous composition.

The single figure is a side elevation of the apparatus.

Referring to the drawings—the container 1 is fitted with a removable air-tight cover 2 upon which is mounted a pressure gauge 3 which communicates with the interior of the container. Centrally in the container is positioned a shaft 4 upon which is mounted the sprocket wheel 5. Two arms 6 are pivoted upon the shaft 4 and support the shafts 7 and 8 which are mounted at their ends and run transversely of the container between the two arms. Upon the shafts 7 and 8 are sprockets 9 and 10 which may be rotated from the central sprocket 5 by means of a chain 11. It is obvious that the sprockets 9 and 10 may be connected to shafts 7 and 8 by clutches. In the top of the container are two guide rolls 12 which serve as a lead for the material which is to be saturated. Along the side of the container are gauge cocks 13 for ascertaining the height of the liquid in the container. Asphalt or other waterproofing substance used in saturating the material is introduced through the inlet line 14 controlled by a valve 15 and an outlet pipe 16 controlled by a valve 17 is supplied on the opposite side of the tank or container for maintaining the proper level of liquid saturant therein.

Briefly describing the mode of saturation,—a roll of the felted fibrous material is mounted upon one of the transverse shafts 7 or 8 and the tank or container filled to a proper level with the liquid saturant. It may be necessary to keep the saturant in heated form and for this purpose heating burners may be supplied beneath the tank as shown at 18. One end of the material is led between the guide rolls 12 and is started upon the shaft 8 which serves as the opposite reeling spool. The top of the container is then securely bolted in place and pressure is imposed upon the container by means of the compressed air pipe 19 regulated by a valve 20. When the pressure has been raised to the desired amount, the central shaft, which extends outside of the container and which is connected to any suitable source and power, is rotated, causing the material to reel from one shaft through the guide rolls 12 on to the spool on the opposite end of the arms 6. In reeling the material in this manner as it is unrolled from the larger spool it passes through the bath of the saturant and is thoroughly coated with a waterproofing substance while being totally immersed therein. The rate of re-reeling the material upon the spool positioned at the opposite end of the arm from that which the material is being taken will be governed somewhat by the amount of saturation desired. Also, instead of a pair of spools being mounted in a single container, one tank may contain a number of rolls to be saturated and a greater amount of material subjected to the pressure saturation simultaneously. After the roll has been thoroughly impregnated with the waterproofing saturant the pressure may be relieved and the top removed after which the saturated roll is removed from the tank and permitted to dry.

It may be noted that the arms which are pivoted on the shaft 5 may be rocked so that either the shaft 8 or the shaft 7 positioned at opposite ends of the arms can be immersed in the saturant and the material reeled from either spool or shaft on to the one at the opposite end of the arms.

The particular advantage of this type of apparatus is that the material is subjected to pressure and saturation while a single ply is totally immersed and passing through the bath of the heated saturant. The uniform character of the saturation and the simplicity of the operation together with the improved character of the product are factors of importance in connection with this simple type of apparatus.

We claim as our invention:—

1. In an apparatus of the character described, the combination with an air tight receptacle adapted to contain a heated liquid saturant, of a shaft passing therethrough, arms carried by said shaft and adapted to rock therewith in the receptacle, rotatable spools at each end of said arms, means for driving said spools by the rotation of said shaft, said spools being capable of an oscillatory movement in the receptacle, and means for imposing a pressure on the saturant in said receptacle.

2. In an apparatus of the character described, the combination with a pressure tight receptacle adapted to contain a heated liquid saturant, of a shaft passing therethrough and journalled in the walls of said receptacle, a sprocket member on said shaft, rocker arms connected with the shaft and extending therefrom in opposite directions, reels mounted on said rocker arms, a drive connection between the sprocket on said shaft and said rolls to operate said rolls in unison, and means for maintaining a pressure within said receptacle.

3. In an apparatus of the character described, the combination with an airtight receptacle adapted to contain a heated liquid saturant, of a shaft passing therethrough, arms carried by said shaft and adapted to rock therewith in the receptacle, rotatable spools at each end of said arms, means for driving said spools by the rotation of said shaft, said spools being capable of an oscillatory movement in the receptacle, means for imposing a pressure on the saturant in said receptacle, and means for heating the contents of said receptacle.

LESTER KIRSCHBRAUN.
CHESTER E. RAHR.